US006317226B1

(12) United States Patent
Yeh et al.

(10) Patent No.: US 6,317,226 B1
(45) Date of Patent: Nov. 13, 2001

(54) DOT MATRIX HOLOGRAM FOR HIDING A MOIRE PATTERN

(75) Inventors: Sheng-Lie Yeh; Jie-Tsuen Lan; Hsiu-Hung Lin, all of Taipei (TW)

(73) Assignee: Ahead Optoelectronics, Inc., Taipei Hsien (TW)

( * ) Notice: Subject to any disclaimer, the term of this patent is extended or adjusted under 35 U.S.C. 154(b) by 0 days.

(21) Appl. No.: 09/408,934

(22) Filed: Sep. 30, 1999

(51) Int. Cl.⁷ .............................. G03H 1/00; G02B 5/18; B42D 15/00
(52) U.S. Cl. .................. 359/2; 359/1; 359/569; 283/86; 283/72; 283/83
(58) Field of Search .................. 359/1, 2, 569; 283/72, 86, 93, 73

(56) References Cited

U.S. PATENT DOCUMENTS 5,396,559 * 3/1995 McGrew ................. 283/73

5,999,280 * 12/1999 Huang ..................... 359/2

* cited by examiner

*Primary Examiner*—Audrey Chang
(74) *Attorney, Agent, or Firm*—A & J

(57) ABSTRACT

A moire pattern technology about a dot matrix hologram for hiding a moire pattern is invented. In the moire pattern hidden region of a dot matrix hologram, the moire pattern foreground area and the moire pattern background area are formed identically by interlacing bright lines and dark lines. While position shifting is formed between the lines of the two areas. This position shifting is several times of the size of the grating dots. Thus, a moire pattern hidden in the moire pattern hidden region without being processed specially has a poor hiding ability. Often the above moire pattern can be identified by eyes directly without using a decoding film. Therefore, such kinds of moire patterns have poor hidden effects. However, the moire pattern of the present invention can prevent the aforesaid phenomenon by a well designed pretended pattern. Moreover, the appearance of such a dot matrix hologram can be beautified by the addition of the pretended patern. Furthermore, in the present invention, a technology of one-dimensional moire patterns is upgraded to a technology of two-dimensional moire patterns.

2 Claims, 4 Drawing Sheets

DOT MATRIX HOLOGRAM FOR HIDING A MOIRE PATTERN

FIELD OF THE INVENTION

The present invention relates a dot matrix hologram for hiding a moire pattern to which a pretended pattern is skillfully added so that the moire pattern can not be identified directly by eyes. Moreover, the appearance of such a dot matrix hologram can be beautified by the addition of a moire pattern. Furthermore, in the present invention, the technology of one-dimensional moire patterns is upgraded to the technology of two-dimensional moire patterns for increasing amount of hiding information and improving the hiding ability of moire patterns.

BACKGROUND OF THE INVENTION

The present invention relates to a moire pattern technology about a dot matrix hologram. For conventional holograms, because the position accuracy of conventional holograms are about 8 millimeters (a position resolution of 3600 dpi)and the dot resolution of a holographic pattern is larger than 60 micrometers (the resolution of basic dots of a pattern is 400 dpi) usually. When the moire pattern foreground areas and the moire pattern background areas are shifted a distance of 8 or 16 micrometers to hide a moire pattern, eyes can not directly see the moire pattern clearly without using a decoding film for the position shifting being much smaller than the size of the resolution. However, for dot matrix holograms, because the resolutions of dot matrix holograms (equal to the size of grating dots) are larger than 20 micrometers (the resolution of basic dots of a holographic pattern is 1300 dpi) usually and the position shifting between the moire pattern foreground areas and the moire pattern background areas are several times of the size of a grating dot, eyes may clearly see the moire pattern without using any decoding film for this purely position shifting case. Thus, the hiding function of the moire pattern is lost. However, the moire patterns of the present invention can overcome the aforesaid phenomenon by a well designed pretended pattern. Moreover, the appearance of such a dot matrix hologram can be beautified simultaneously. Furthermore, in the present invention, the technology of one-dimensional moire patterns is upgraded to a technology of two-dimensional moire patterns.

The various objects and advantages of the present invention will be more readily understood from the following detailed description when read in conjunction with the appended drawing.

DESCRIPTION OF THE PREFERRED EMBODIMENT

The embodiment of the present invention shown in the appended figures will be described in the following.

Figure 1:
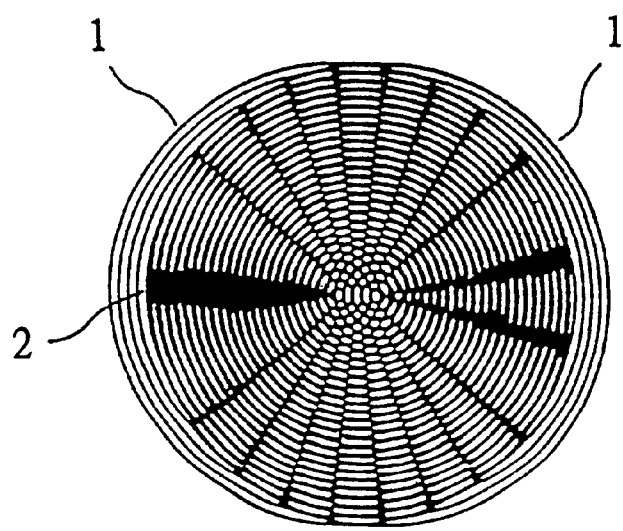
FIG. 1 is a schematic view for generating a moire pattern.

With reference to FIG. 1, a schematic view for generating a moire pattern is illustrated. The moire is meant to overlap two identical patterns 1. The upper layer is formed by interlacing transparent areas and opaque areas, and is called as a decoding film, while the lower layer is formed by interlacing bright areas and dark areas, and is called as an encoded pattern.

In a hologram, other than the section having holographic effects, a moire pattern hidden region is also included. The moire pattern hidden region can be subdivided as a moire pattern foreground area and a moire pattern background area. When a correct decoding film covers the two areas, different brightness will appear. Thus, the moire pattern foreground area and the moire pattern background area can be identified by eyes so as to show the moire pattern.

Figures 2, 3:
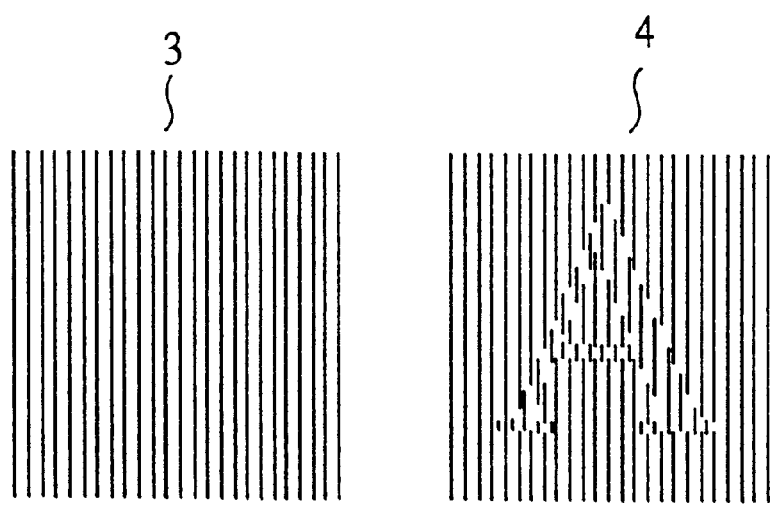
FIG. 2 is a schematic view of the pattern of a typical decoding film.
FIG. 3 is a schematic view showing a typical encoded pattern.

Although, the patterns of the decoding film of upper layer and the encoded pattern of lower layer may be any periodical patterns, however, for the sake of convenience, the upper decoding pattern 3 (as shown in FIG. 3) usually is a periodically binary straight line family with transparent lines and opaque lines being interlaced periodically.

Figure 4:
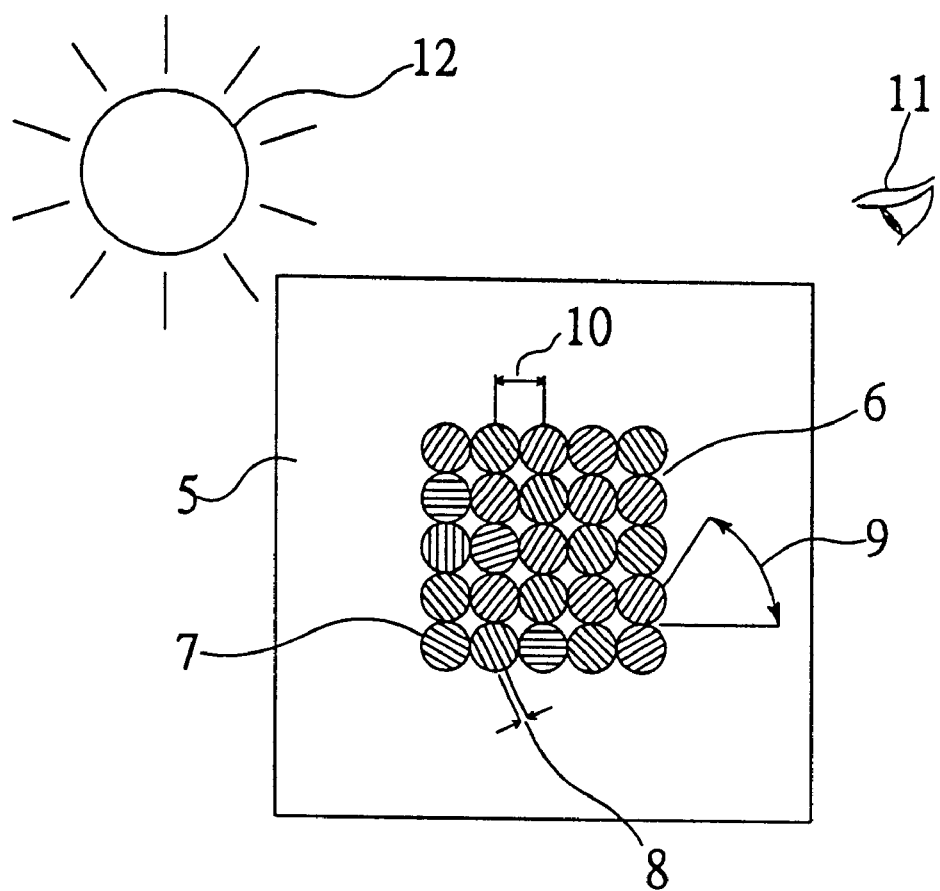
FIG. 4 is a schematic view showing a dot matrix hologram.

For simplicity in design, the encoded pattern of lower layer 4 (as shown in FIG. 4) is also a periodically binary line family. However, a position shifting is existent between the moire pattern foreground area and the moire pattern background area (the orientation of the position shifting is vertical to the line direction). However, the amount of position shifting can not be equal to the interlacing period of the parallel lines.

The pattern on a decoding film employed in the present invention is similar to that shown in FIG. 2. We use encoded patterns have similar patterns like as that showing in FIG. 3 and add special processing on them. When the interlacing period of the lines of a decoding film is equal to that of the lines of the encoded pattern, the two patterns can be paired successfully and the decoding of the moire pattern can be performed. Thus, the moire patterns with different resolutions need different decoding films.

A schematic view of a dot matrix hologram 5 is illustrated in FIG. 4, which is formed by a group of grating dots 6 constituted with many grating dots 7. When the grating angles 9 and grating pitches 8 of the grating dots are different, under the illumination of a light source 12, the grating dots will show different colors of light to an eye 11 if we rotate the hologram. The shape of the grating dot 7 may have a round shape, a square shape or one of the other shapes. But, in general, in a dot matrix, the longitudinal period is equal to the transversal period. Herein, we call the period 10 as a size of a grating dot.

Figure 5:
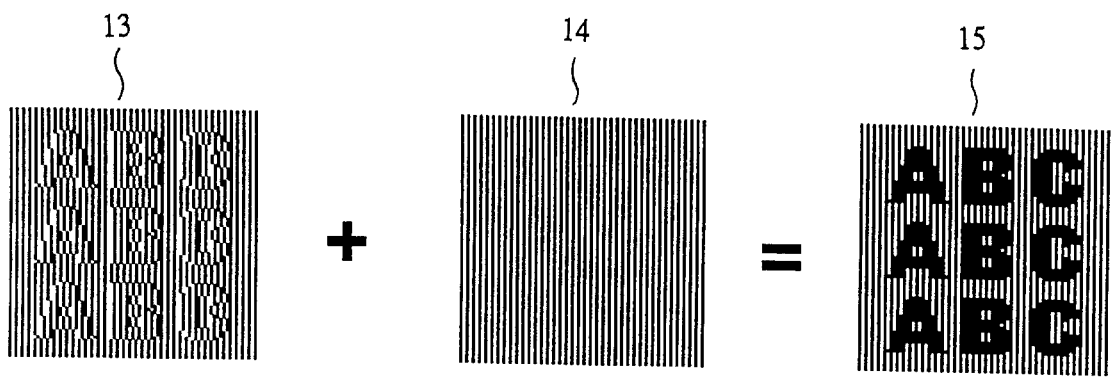
FIG. 5 is a schematic view for decoding the moiré pattern of an one-dimensional dot matrix hologram without partially deleting or adding grating dots of the moiré pattern hidden region.
Figure 6:
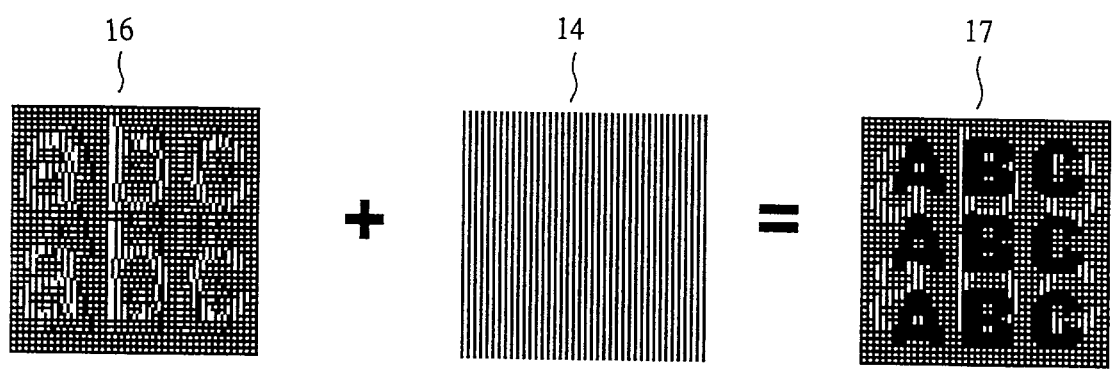
FIG. 6 is a schematic view for decoding the moiré pattern of a onedimensional dot matrix hologram with partially deleting and adding grating dots of the moiré pattern hidden region.

A conventional hologram is based on an original film with a position accuracy of 3600 dpi, while the dot resolution of the pattern is usually smaller than 400 dpi. Thus, though the moire pattern is hidden by position shifting without using any decoding film, the moire pattern still can not be seen (since the amount of position shifting is much smaller than the resolution). However, when a dot matrix hologram is employed, since the position shifting between the moire pattern foreground area and the moire pattern background area is several times of the size of a grating dot 10, the moire pattern will be easily seen by eyes. With reference to FIG. 5, an one-dimensional dot matrix moire pattern 13 without adding any interfering dot and another one-dimensional dot matrix pattern 15 with adding bright dots, dark dots, and vacant dots are illustrated herein. It is apparent that only using position shifting does not work well, therefore, a more auxiliary process is necessary. In the present invention, some dots of the encoded pattern are deleted and some extra grating dots are added into the empty area without grating dots of the moire pattern hidden region. The deleting and adding of the grating dots of the moiré pattern hidden region can be determined randomly or predetermined as long as they don't interfere with the decoding of the hidden moiré pattern. Shown in FIG. 6 is an one-dimensional dot matrix moiré pattern 16 with partially deleting and adding to show a moiré pattern 17 with overlapping a decoding film 14 on it.

Figure 7:
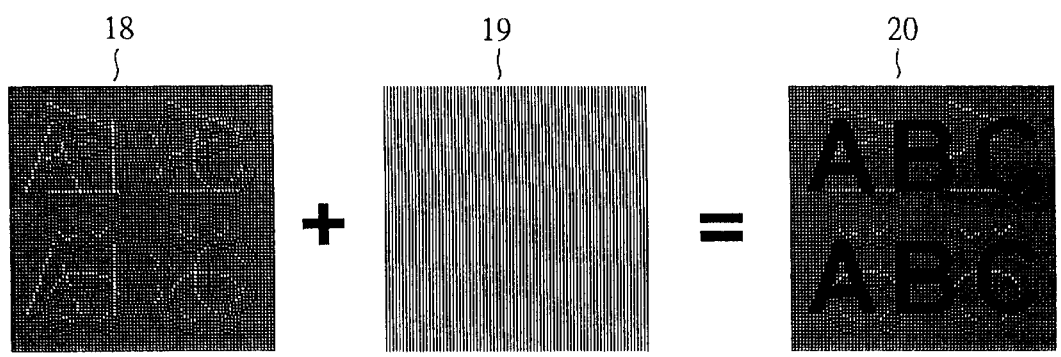
FIG. 7 is a schematic view for decoding the first one-dimensional moiré pattern of a two-dimensional dot matrix hologram without partially deleting or adding grating dots of the moiré pattern hidden region.
Figure 8:
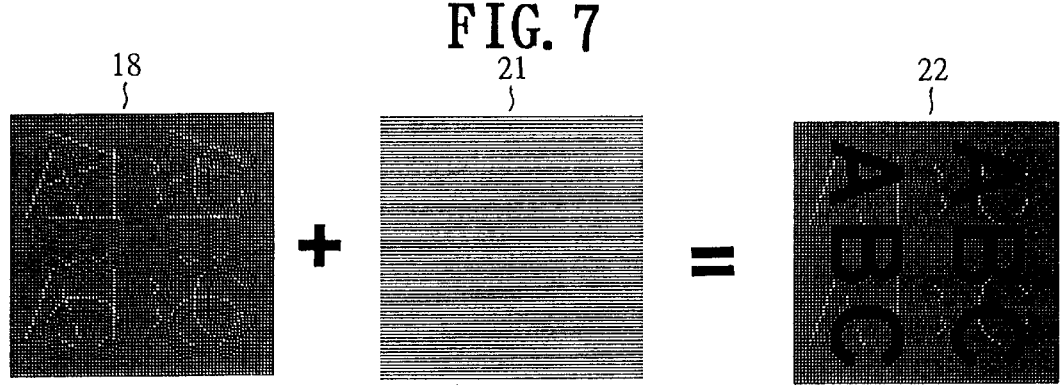
FIG. 8 is a schematic view for decoding the second one-dimensional moiré pattern of a two-dimensional dot matrix hologram without partially deleting or adding grating dots of the moiré pattern hidden region.
Figure 9:
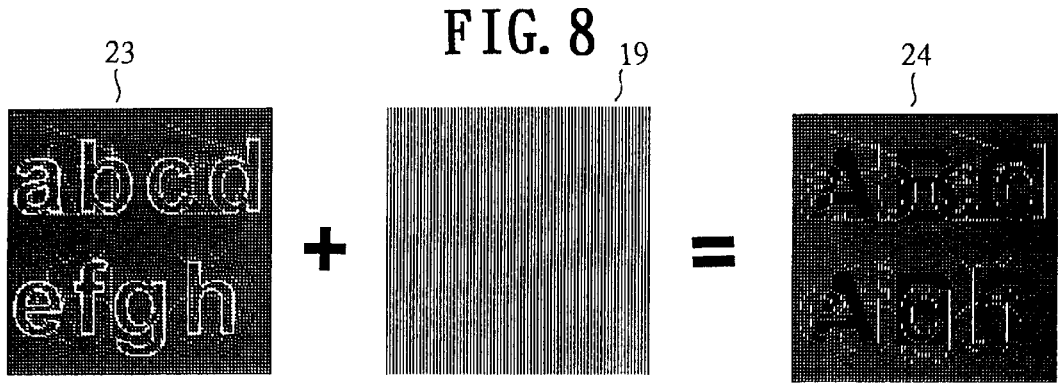
FIG. 9 is a schematic view for decoding the first one-dimensional moire pattern of a two-dimensional dot matrix hologram with partially deleting and adding grating dots of the moiré pattern hidden region.
Figure 10:
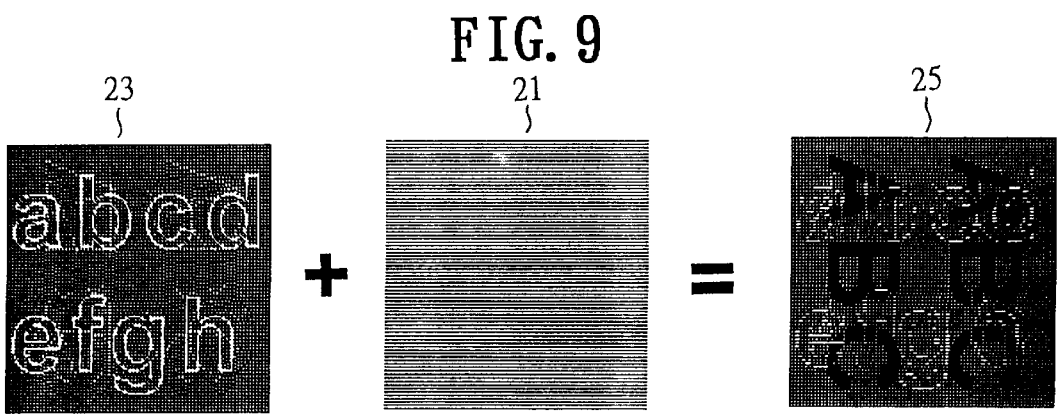
FIG. 10 is a schematic view for decoding the second one-dimensional moiré pattern of a two-dimensional dot matrix hologram with partially deleting and adding grating dots of the moiré pattern hidden region.

Aforementioned descriptions are all one-dimensional moiré patterns, while the two-dimensional moiré patterns can be obtained by overlapping two sets of one-dimensional moiré patterns in the longitudinal and transversal directions respectively, The method of overlapping two one-dimensionally periodical bright lines and dark lines can use the AND overlapping method (every position after overlapping has a grating dot only when both of the two one-dimensional patterns should have a grating dot at the corresponding position, or it has no grating dot) or the OR overlapping method (every position after overlapping has a grating dot when at least one of the two one-dimensional patterns should have a grating dot at the corresponding position, or it has no grating dot). If only a two-dimensional interlacing pattern is used, the complexity of the pattern is still not enough so that the moiré pattern can be seen directly. For example, FIGS. 7 and 8 show a two dimensional dot matrix moiré pattern 18 without partially deleting or adding grating dots of the moiré pattern hidden region. The ABCs with horizontal and vertical directions in the moiré pattern 18 can be seen directly by eyes though they are not clear.

Therefore, in order to increase the hiding ability of a moiré pattern, the aforementioned technology of partially deleting and adding grating dots of the moiré pattern hidden region to induce a pretended pattern is necessary. When a longitudinal and a transversal one-dimensional line texture decoding films 19 and 21 are covered respectively, the moiré patterns 24 and 25 can be viewed respectively. The moiré patterns hidden in the encoded pattern 23 can not be seen directly by eyes. Since the hidden sections of the encoded pattern 23 is combined with longitudinal and transversal lines, it can be divided into a longitudinal moire pattern foreground area and a longitudinal moire pattern background area for longitudinal lines, moreover, it also may be divided into a transversal moiré pattern foreground area and a transversal moiré pattern background area for transversal lines. The periods of the two directions may be equal or unequal. When the periods are unequal, both the two decoding films are needed. As the periods are equal, only one decoding film is needed. A transversal position shifting is existent between the longitudinal moire pattern foreground area and the longitudinal moire pattern background area. A longitudinal position shifting is existent between the transversal moire pattern foreground area and a transversal moire pattern background area. These two position shifting are several times of the size of the grating dot 10 respectively and are unequal to the interlacing periods of the longitudinal lines and the transversal lines respectively.

We claim:

1. A dot matrix hologram for hiding a moire pattern, the hologram being formed by grating dots; the hologram includes at least one moiré pattern hidden region; for generally viewing, a pretended pattern included in the moiré pattern hidden region can be seen; if two correct decoding films with respective longitudinal and transversal straight line patterns with interlacing transparent straight lines and opaque straight lines one-dimensionally periodically covers the moiré pattern hidden region with a proper orientation, a moiré pattern different from both the appearance of the decoding film and the appearance of the moiré pattern hidden region appears; the moiré pattern hidden region is formed by combining a moiré pattern foreground area and a moiré pattern background area, wherein the two areas are both formed by periodically interlacing bright lines and dark lines; the pretended pattern is added to replace dots of the moiré pattern hidden region partially thereon; the interlacing ways of the lines of the moiré pattern foreground area and the moiré pattern background area are identical, but the line families in these two areas have position shifting the pretended pattern which serves to partially delete and add the dots of the moiré pattern hidden region so that eyes will see this pretended pattern instead of seeing the hidden moiré pattern.

2. A dot matrix hologram for hiding a moiré pattern, the hologram being formed by grating dots; the hologram includes at least one moiré pattern hidden region; for generally viewing, a pretended pattern included in the moiré pattern hidden region can be seen; if two correct decoding films with respectively longitudinal and transversal straight line patterns cover the moiré pattern hidden region with proper orientations, two moiré patterns can be seen respectively; for the longitudinal-line decoding film, the moiré pattern hidden region can be divided as a longitudinal moiré pattern foreground area and a longitudinal moiré pattern background area; for the transversal-line decoding film, the moiré pattern coding film can be divided as a transversal moiré pattern foreground area and a transversal moiré pattern background area; the moiré pattern hidden region is formed both by periodically interlacing longitudinal bright lines and longitudinal dark lines and periodically interlacing transversal bright lines and transversal dark lines, then adding a pretended pattern to replace the dots of the moiré pattern region partially; the line interlacing structures of the longitudinal moiré pattern foreground area and the longitudinal moiré pattern background area are identical, but there is transversal position shifting between the lines of the longitudinal moiré pattern foreground area and those of the longitudinal moiré pattern background area; the line interlacing structures of the transversal moiré pattern foreground area and the transversal moiré pattern background area are identical, but there is position shifting between the lines of the transversal moiré pattern foreground area and those of the transversal moiré pattern background area; the line interlacing period of the transversal moiré pattern foreground area and the transversal moiré pattern background area are both equal to the line interlacing period of the lines of the transversal-line decoding film; the pretended pattern serves to add and delete the dots of the moiré pattern hidden region partially so that eyes will see this pretended pattern instead of seeing the hidden moiré pattern.

* * * * *